(12) United States Patent
Strong et al.

(10) Patent No.: US 11,267,010 B2
(45) Date of Patent: Mar. 8, 2022

(54) SYSTEMS AND METHODS FOR A MATERIAL SENSOR FOR A MATERIAL TANK

(71) Applicant: Carlisle Fluid Technologies, Inc., Scottsdale, AZ (US)

(72) Inventors: Christopher Lee Strong, Frederick, CO (US); Bradley Paul Walter, Lafayette, CO (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 359 days.

(21) Appl. No.: 15/793,814

(22) Filed: Oct. 25, 2017

(65) Prior Publication Data
US 2018/0111147 A1 Apr. 26, 2018

Related U.S. Application Data (60) Provisional application No. 62/413,407, filed on Oct. 26, 2016.

(51) Int. Cl.
*B05B 7/00* (2006.01)
*B05B 12/00* (2018.01)
(Continued)

(52) U.S. Cl.
CPC ............ *B05B 12/008* (2013.01); *B05B 1/202* (2013.01); *B05B 7/2489* (2013.01);
(Continued)

(58) Field of Classification Search
CPC ... G05D 9/12; G05D 9/00; G05D 9/02; G01F 11/284; G01F 23/0007; G01F 23/0061;
(Continued)

(56) References Cited

U.S. PATENT DOCUMENTS 2,894,732 A * 7/1959 Taber .................... B29B 7/7626
366/143
3,010,320 A 11/1961 Sollecito
(Continued)

FOREIGN PATENT DOCUMENTS

CN 203274836 U 11/2013
CN 104035390 A 9/2014
(Continued)

OTHER PUBLICATIONS

International Search Report and Written Opinion for PCT Application No. PCT/US2017/058581 dated Feb. 13, 2018, 13 pgs.
(Continued)

*Primary Examiner* — Hailey K. Do
(74) *Attorney, Agent, or Firm* — Fletcher Yoder, P.C.

(57) ABSTRACT

A system having a material sensor system coupled to a material tank is provided. The material tank is configured to receive a quantity of the material and output a flow of the material. The material sensor system includes a float system coupled to an inner surface of the material tank. The float system includes a float configured float within a float cavity. The material sensor system includes a switch coupled to an outer surface of the material tank. The switch is communicatively coupled to the float system through a wall of the material tank, and the switch is configured to send one or more signals to a control system when the float engages the switch.

20 Claims, 3 Drawing Sheets (51) Int. Cl.

| | | |
|---|---|---|
| B05B 7/32 | (2006.01) | |
| G01F 23/74 | (2006.01) | |
| B05B 7/24 | (2006.01) | |
| F04B 13/02 | (2006.01) | |
| B05B 12/14 | (2006.01) | |
| B05B 16/25 | (2018.01) | |
| B05B 1/20 | (2006.01) | |
| B05B 12/08 | (2006.01) | |
| B65D 83/00 | (2006.01) | |
| F04B 49/06 | (2006.01) | |
| B05B 16/00 | (2018.01) | |
| B05B 5/03 | (2006.01) | |
| B05B 9/04 | (2006.01) | |
| F04B 53/10 | (2006.01) | |

(52) U.S. Cl.
CPC .......... *B05B 7/2494* (2013.01); *B05B 7/2497* (2013.01); *B05B 7/32* (2013.01); *B05B 12/088* (2013.01); *B05B 12/1418* (2013.01); *B05B 16/25* (2018.02); *B65D 83/005* (2013.01); *F04B 13/02* (2013.01); *F04B 49/06* (2013.01); *G01F 23/74* (2013.01); *B05B 5/03* (2013.01); *B05B 7/0081* (2013.01); *B05B 9/0406* (2013.01); *B05B 9/0413* (2013.01); *B05B 16/00* (2018.02); *F04B 53/1012* (2013.01); *F04B 2203/0201* (2013.01)

(58) Field of Classification Search
CPC ...... G01F 23/0069; G01F 23/30; G01F 23/56; G01F 23/60; G01F 23/603; G01F 23/62; G01F 23/64; G01F 23/68; G01F 23/70; G01F 23/72; G01F 23/74; Y10T 137/742; Y10T 137/7423; B01F 3/08; B01F 3/0803; B01F 3/0853; B01F 3/088; B01F 12/002; B01F 12/14; B01F 12/1418; B01F 15/0416; B01F 15/042; B01F 2215/005; B05B 7/04; B05B 7/0408; B05B 7/0416; B05B 7/0081; B05B 7/2489; B05B 7/2494; B05B 7/2497; B05B 7/26; B05B 12/002; B05B 12/14; B05B 12/1418

See application file for complete search history.

(56) References Cited

U.S. PATENT DOCUMENTS

| | | | |
|---|---|---|---|
| 3,275,011 A | | 9/1966 | Berezansky et al. |
| 4,090,050 A | * | 5/1978 | Siiberg .................. G01F 23/74 200/61.2 |
| 4,194,397 A | * | 3/1980 | Yasuda .................. G01F 23/66 73/314 |
| 4,571,092 A | | 2/1986 | Switall |
| 4,610,165 A | | 9/1986 | Duffy et al. |
| 4,675,116 A | * | 6/1987 | Hoyland .................. B01D 37/03 210/709 |
| 5,035,512 A | * | 7/1991 | Tateishi .................. G01F 23/74 236/48 R |
| 5,426,271 A | * | 6/1995 | Clark .................. B29C 44/0415 200/51 R |
| 6,028,521 A | | 2/2000 | Issachar |
| 6,095,371 A | * | 8/2000 | Mooney .................. B01F 5/0498 222/57 |
| 6,203,183 B1 | | 3/2001 | Mordaunt et al. |
| 6,326,895 B1 | | 12/2001 | Hartke et al. |
| 6,533,449 B1 | * | 3/2003 | Auad .................. B01F 3/088 366/132 |
| 6,612,543 B2 | | 9/2003 | Strobel |
| 6,892,573 B2 | | 5/2005 | Gansebom |
| 6,998,552 B1 | * | 2/2006 | Li .................. G01F 23/706 200/310 |
| 7,249,507 B2 | | 7/2007 | Weedon |
| 7,338,028 B2 | | 3/2008 | Zimmerling et al. |
| 7,377,162 B2 | * | 5/2008 | Lazaris .................. A47J 31/4457 222/51 |
| 7,587,897 B2 | | 9/2009 | Strong |
| 7,603,855 B2 | | 10/2009 | Strong |
| 8,291,761 B2 | | 10/2012 | Burdi et al. |
| 8,402,822 B2 | | 3/2013 | Hopper |
| 8,404,822 B2 | | 3/2013 | Kuribayashi et al. |
| 8,640,729 B2 | | 2/2014 | Dana |
| 8,650,949 B1 | | 2/2014 | Ostlie et al. |
| 9,003,878 B2 | | 4/2015 | Mawhinney et al. |
| 2006/0014062 A1 | * | 1/2006 | Wheat .................. G05D 9/12 137/2 |
| 2013/0160871 A1 | * | 6/2013 | Mawhinney ............. B60S 1/50 137/409 |
| 2015/0050012 A1 | * | 2/2015 | Chang .................. F24H 9/2028 392/465 |
| 2015/0287313 A1 | * | 10/2015 | Silvers .................. G01F 23/0015 340/618 |
| 2016/0123791 A1 | * | 5/2016 | Yasuda .................. G01F 23/72 73/305 |
| 2017/0102261 A1 | * | 4/2017 | Payne .................. G01F 23/72 |

FOREIGN PATENT DOCUMENTS

| | | | | |
|---|---|---|---|---|
| FR | 2466002 A1 | | 3/1981 | |
| FR | 2466002 A | * | 4/1981 | ............. F01P 11/18 |
| GB | 2028505 A | | 3/1980 | |
| GB | 2292836 A | | 3/1996 | |
| JP | S57113297 A | | 7/1982 | |
| JP | S5920859 U | | 2/1984 | |
| WO | 2009128506 A1 | | 10/2009 | |

OTHER PUBLICATIONS

Chinese Office Action for CN Application No. 201780063917.8 dated May 28, 2020, 6 pg.
Japanese Office Action for JP Application No. 2019-522357 dated Jun. 30, 2020, 2 pg.
EP Examination Report for EP Application No. 17795173.8 dated Jun. 3, 2020, 5 pgs.

* cited by examiner

SYSTEMS AND METHODS FOR A MATERIAL SENSOR FOR A MATERIAL TANK

CROSS-REFERENCE TO RELATED APPLICATION

This application claims priority to and the benefit of U.S. Provisional Application No. 62/413,407 entitled "SYSTEMS AND METHODS FOR A MATERIAL SENSOR FOR A MATERIAL TANK," filed on Oct. 26, 2016, which is herein incorporated by reference in its entirety.

BACKGROUND

The subject matter disclosed herein relates to sprayers, and more particularly, to a material sensor for detecting an interruption of a flow of material within a material supply system.

Sprayers, such as spray guns, are used to apply a spray coating to a wide variety of target objects. Such sprayers are typically coupled to a material source, an air source, or other gas source. In some situations, a material supply system having one or more components may be utilized to route the material from a material source to each of one or more spray guns. For example, the material supply system may include one or more tanks that may be utilized to direct the material from the material source to the spray gun. In some situations, a flow of the material through the material supply system (e.g., through the one or more tanks) may be interrupted. For example, the source of the material may be empty or may need to be refilled with a fresh supply of the material (e.g., out-of-material condition). In such situations, it may be beneficial to stop operation of the tank within the material supply system, in order to help reduce damage caused by operating a tank without a material. Accordingly, it may be beneficial to provide for systems and methods that automatically stop operation of the tank within a material supply system in an out-of-material condition.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system having a material sensor system coupled to a material tank is provided. The material tank is configured to receive a quantity of the material and output a flow of the material. The material sensor system includes a float system coupled to an inner surface of the material tank. The float system includes a float configured float within a float cavity. The material sensor system includes a switch coupled to an outer surface of the material tank. The switch is communicatively coupled to the float system through a wall of the material tank, and the switch is configured to send one or more signals to a control system when the float engages the switch.

In a second embodiment, a system is provided. The system includes a material tank configured to receive a quantity of the material and output a flow of the material. The system includes a material sensor system coupled to the material tank and the material sensor system includes a float system and a switch. The float system is coupled to an inner surface of the material tank, and the float system includes a float configured float within a float cavity. The switch is coupled to an outer surface of the material tank, and the switch is communicatively coupled to the float system through a wall of the material tank. The switch is configured to send one or more signals when the float engages the switch. The system also includes a control system configured to receive the one or more signals from the material sensor system. The control system is configured to determine the quantity of the material within the material tank based on the one or more signals received.

In a third embodiment, a system is provided. The system includes one or more material tanks, and each material tank is configured to receive a quantity of a material and output a flow of the material. Each material tank includes at least one material sensor system, and each material sensor system includes a float and a switch. The float system is coupled to an inner surface of the material tank, and the float system includes a float configured float within a float cavity. The switch is coupled to an outer surface of the material tank, and the switch is communicatively coupled to the float system through a wall of the material tank. The switch is configured to send one or more signals to a control system when the float engages the switch. The system also includes a material mixer configured to receive the flow of the material from each material tank and a control system configured to receive the one or more signals from each material sensor system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to a material sensor system configured to detect an interruption of a flow of material within a material supply system. Specifically, the material supply system may be configured to direct a material (e.g., paint, ink, varnish, water, catalyst, resin, solvent, etc.) from a material source (e.g., a material supply) to a material mixer (e.g., paint mixer). For example, the material supply system may include various tanks (e.g., pressure tank, pressure pots, etc.) configured to route the material from the material source to the material mixer, the spray device, or any other receiving device. In particular, the material sensor system may be configured to detect when the flow of the material through the material supply system (e.g., via the pressure tank) is interrupted, as further described in detail below. Furthermore, the material sensor system may be configured to automatically shut down operation of the material supply system (e.g., the pressure tank) when the flow of the material through the material supply system is interrupted, as further described in detail below.

The sprayer may be a handheld manual spray gun, an automated spray unit (e.g., a robotic mounted spray unit), a spray booth mounted spray unit, or any other suitable spray device. The sprayer also may include a pneumatic driven spray device, which uses a gas (e.g., air) to help atomize a liquid, shape a spray of the liquid, operate a valve of the sprayer, or a combination thereof. The sprayer may include a rotary bell cup, which rotates a bell cup to help create a spray. The sprayer may include an electrostatic spray device, which generates an electric field to help attract a spray onto a target object. Furthermore, the sprayer may be a spray coating device configured to produce a spray of a coating material, such as paint, for creating a coating on a surface of an object. In particular, the sprayer may receive a supply of the material from a material supply system, as further described in detail below.

The material mixer (e.g., paint mixer) may be a two-component (2K) mixer, such as a two-component paint mix-and-meter machine. In certain embodiments, the material mixer may be utilized to receive and mix any number of material components. The material mixer may be utilized within a variety of coating applications and with a variety of accessory components, such as the sprayers. Specifically, the material mixer may be utilized to generate a material mixture having a specific ratio of materials. In particular, the material mixer may utilize a continuous flow of each material fed into the material mixer, so that the mixed material is properly metered.

In certain situations, the flow of the material from the material source (e.g., pressure tank, a container of the material, a supply of the material, etc.) to the material mixer may be interrupted. For example, the flow of the material may be interrupted when the supply of the material is empty, such as when the material container needs to be refilled and/or replaced. As a further example, a material leak within the system may interrupt the flow of the material from the material source to the sprayer. In these and other situations where the material cannot reach the material mixer, air enters the material supply system. However, routing air through the pressure tank, and subsequently through the material mixer, may prematurely harm downstream components configured to utilize the material. For example, in certain embodiments, a pressure tank may route two materials (e.g., resin and catalyst) to a mixing system configured to receive each of the two materials at a predetermined flow rate. In particular, the mixing system may be configured to mix the materials with a particular ratio of the first material to the second material. Accordingly, when a material cannot reach the tank, air may be routed into the mixing system, causing the mixing system to produce an off-ratio mixture of the two materials.

Accordingly, it may be beneficial to utilize a material sensor system that detects when the flow of the material through the material supply system is interrupted (e.g., out-of-material condition), as further described in detail below. Specifically, the material sensor system may be disposed within the pressure tank, and may be configured to detect an out-of-material condition within a particular pressure tank. Furthermore, it may be beneficial to utilize a material sensor system to automatically shut down operation of the material supply system (e.g., the pressure tank) when the flow of the material through the material supply system is interrupted, as further described in detail below.

Figure 1:
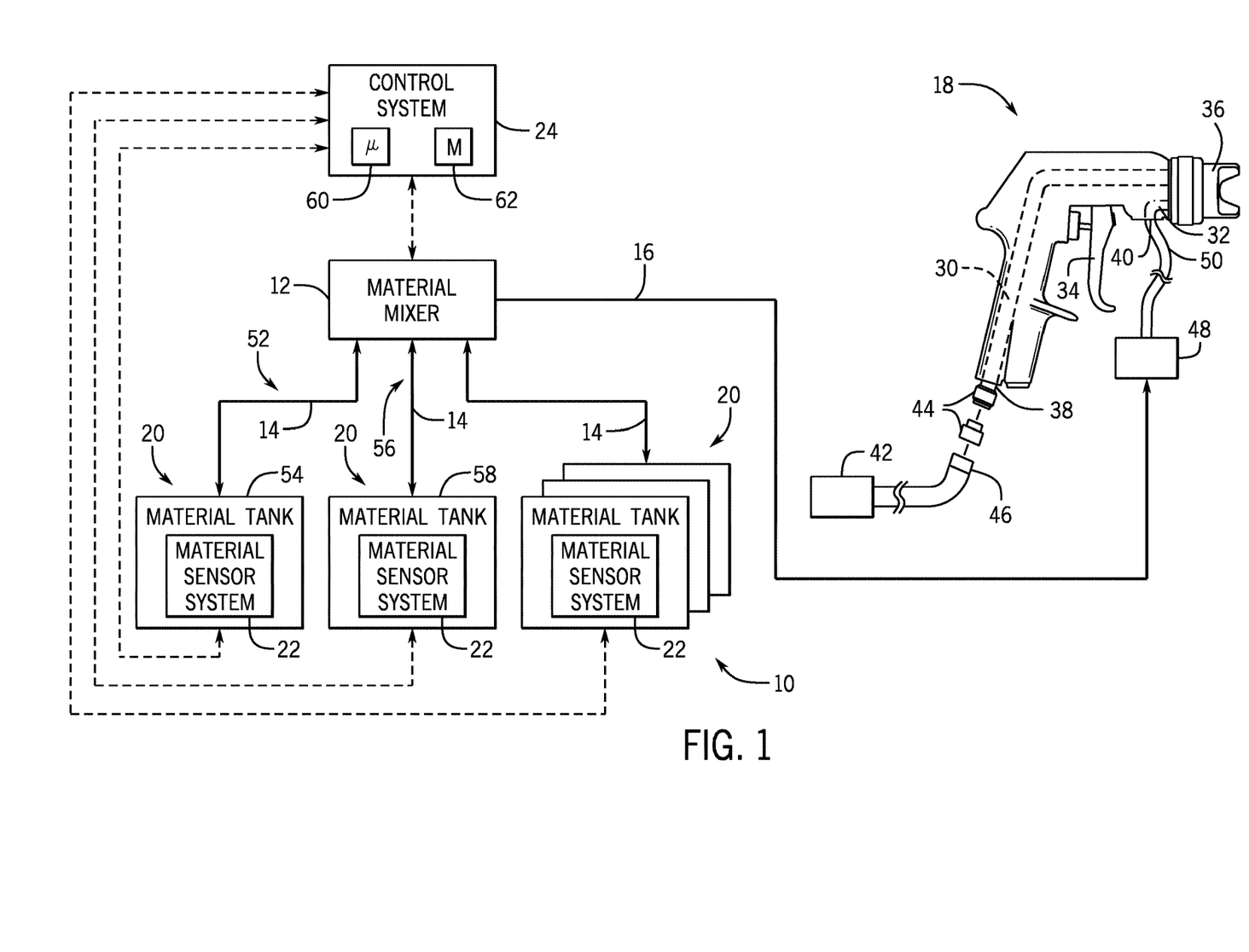
FIG. 1 is a schematic block diagram of an embodiment of a material supply system coupled to a material mixer, where the material supply system includes one or more material tanks.

FIG. 1 is a schematic block diagram of an embodiment of a material supply system 10 coupled to a material mixer 12. The material mixer 12 may be configured to receive and utilize one or more different types of materials 14 to generate a mixed material 16 having a particular composition. For example, the materials 14 may be paint, water, ink, varnish, catalyst, resin, solvent, etc. In certain embodiments, the material mixer 12 may be configured to route the mixed material 16 to one or more sprayers 18, which may utilize the mixed material 16 for spraying coatings. In certain embodiments, one or more material tanks 20 (e.g., pressure tanks) may store the one or more different types of materials 14 and may route the different materials 14 to the material mixer 12. In particular, certain embodiments of the present disclosure relate to a material sensor system 22 configured to detect an interruption in the flow of the material 14 (e.g., out-of-material condition) from the material tank 20 to the material mixer 12, as further described in detail below. Furthermore, in certain embodiments, a control system 24 communicatively coupled to each material sensor system 22 may be configured to shut off the continuous flow of the material 14 into the material mixer 12 upon detecting the out-of-material condition, as further described in detail below.

In certain embodiments, the sprayer 18 may be any spray-coating device (e.g., gravity-feed, siphon, high-volume low-pressure, or pressure) suitable for spraying coatings. The sprayer 18 includes a variety of passages, such as an air passage 30 and a fluid passage 32. In operation, a trigger 34 or other suitable control may send air and fluid through the air passage 30 and fluid passage 32 of the sprayer 18 enabling release of an air-fluid mixture through the nozzle 36. The sprayer 18 may include an air inlet 38 and a fluid inlet 40 to receive air and fluids into the air passage 30 and the fluid passage 32 of the sprayer 18. The air inlet (i.e. port) 38 and the fluid inlet (i.e. port) 40 may be coupled to one or more spray components, such as an air source 42 and a fluid source 40 (e.g., a fluid conduit and/or siphon feed container). For example, in certain embodiments, the air inlet 38 may couple to an air source 42, which may be an air compressor or an air reservoir (e.g., air tank). The air inlet 38 may couple to the air source 42 using a variety of connections. For instance, the air inlet 38 may include a connector 44 (e.g., male) and the air source 38 may include corresponding connector 46 (e.g., female). In some embodiments, the air inlet 38 may be a female connector 44 and the air source 42 may be a male connector 46.

Similarly, the fluid inlet (i.e., port) 40 may couple to the fluid supply system 48, which may include a fluid source (e.g., the material mixer 12), a fluid conduit (e.g., hose) 50, a fluid reservoir (e.g., a gravity feed fluid container, a siphon feed fluid container, a multi-fluid feed container, disposable cup, fluid container), and/or another fluid supply system 48 using a variety of connections. In certain embodiments, the fluid supply system 48 may be coupled to the material mixer 12, such that the fluid supply system 48 receives the mixed material 16 from the material mixer 12 and is output by the sprayer 18.

In certain embodiments, the material mixer 12 (e.g., paint mixer) may receive one or more different materials 14 (e.g., paint, varnish, ink, catalyst, resin, solvent, etc.), and may be configured to generate the mixed material 16 having a particular material composition. For example, the material mixer 12 may be a two-component (2K) mixer, such as a two-component paint mix-and-meter machine. In other embodiments, the material mixer 12 may be a three-component, four-component, five-component, six-component or more material mixer 12. In certain embodiments, the material mixer 12 may be utilized within a variety of coating applications and with a variety of accessory components, such as with one or more sprayers 18. For example, the material mixer 12 may be fluidly coupled with one or more sprayers 18, and may be configured to route the mixed material 16 to each of the one or more sprayers 18.

In certain embodiments, the material mixer 12 may receive one or more individual flows of materials 14 from the one or more material tanks 20, and may be configured to mix the received materials 14 to generate the mixed mixture 16 having a specific ratio of the materials 14. For example, a two-component material mixer 12 may receive a first material 52 from a first material tank 54 and a second material 56 from a second material tank 58. Further, the material mixer 12 may mix the first material 52 and the second material 56 such that the resulting mixed mixture 16 includes a particular ratio of the first material 52 to the second material 56. Accordingly, the material mixer 12 may receive a continuous flow of each material 14 into the material mixer 12, so that the mixed material 16 is properly metered. In certain embodiments, the material sensor system 22 may be disposed within each pressure tank 22 of material, and may be configured to detect an interruption in the continuous flow of the material into the material mixer 12, as further described with respect to FIG. 2.

In certain embodiments, the system 10 may include the control system 24 (e.g., controller 24) having a processor 60 and a memory 62. In certain embodiments, the control system 24 may be a pneumatic control system. In certain embodiments, the processor 60 may be configured to execute instructions stored on the memory 62 to carry out monitoring and/or control operations of the system 10. The memory 62 may be configured to store instructions that are loadable and executable on the processor 60. In certain embodiments, the memory 62 may be volatile (such as random access memory (RAM)) and/or non-volatile (such as read-only memory (ROM), flash memory, etc.). The control system 24 may also include additional removable storage and/or non-removable storage including, but not limited to, magnetic storage, optical disks, and/or tape storage. In some implementations, the memory 62 may include multiple different types of memory, such as static random access memory (SRAM), dynamic random access memory (DRAM), or ROM.

In certain embodiments, the control system 24 is communicatively coupled to the one or more materials tanks 20, the one or more material sensor systems 22 associated with each material tank 20, and/or the material mixer 12. For example, the control system 24 may receive information from each material sensor system 22 associated with the flow and supply of material 14 related to the material tank 20 associated with the material sensor system 22. Further, based on the received information, the control system 24 may be configured to control and regulate the operation of the material mixer 12. For example, based on feedback information received from the material sensor systems 22, the control system 24 may be configured to regulate the blending of the materials 14 (e.g., the first material 52 and the second material 56) within the material mixer 12. Further, in certain embodiments, the control system 24 may receive operator input from a user, and may utilize the received inputs to generate operating commands for adjusting the blending of the material mixer 12, the flow conditions of the system 10, regulate the flow rate of the mixed material 16 supplied to the sprayer 18, adjust the flow rate of the materials 14 supplied to the material mixer 12, and so forth.

In certain embodiments, the control system 24 is communicatively coupled to each material sensor system 22, and may be configured to shut off the continuous flow of the material 14 from the material tank 20 to the material mixer 12 upon detecting the out-of-material condition. For example, an out-of-material condition may be indicative of a situation where the flow of the material 14 from one or more of the material tanks 20 to the material mixer 12 is interrupted. In some situations, the flow may be interrupted when the material tank 20 is almost empty, when the material 14 cannot reach the material mixer 12, due to obstructions within the material tank 20, when air is routed into the material tank 20 and/or the material mixer 12, or in other similar situations. In these and other situations, the control system 24 may be configured to shut off the flow of the material 14 into the material mixer 12, thereby helping to prevent potential harm to downstream components (e.g., the material mixer 12 and/or the sprayer 18), an inaccurate composition of the mixed material 16, an inaccurate blending of the first material 52 to the second material 58, or a combination thereof.

Figure 2:
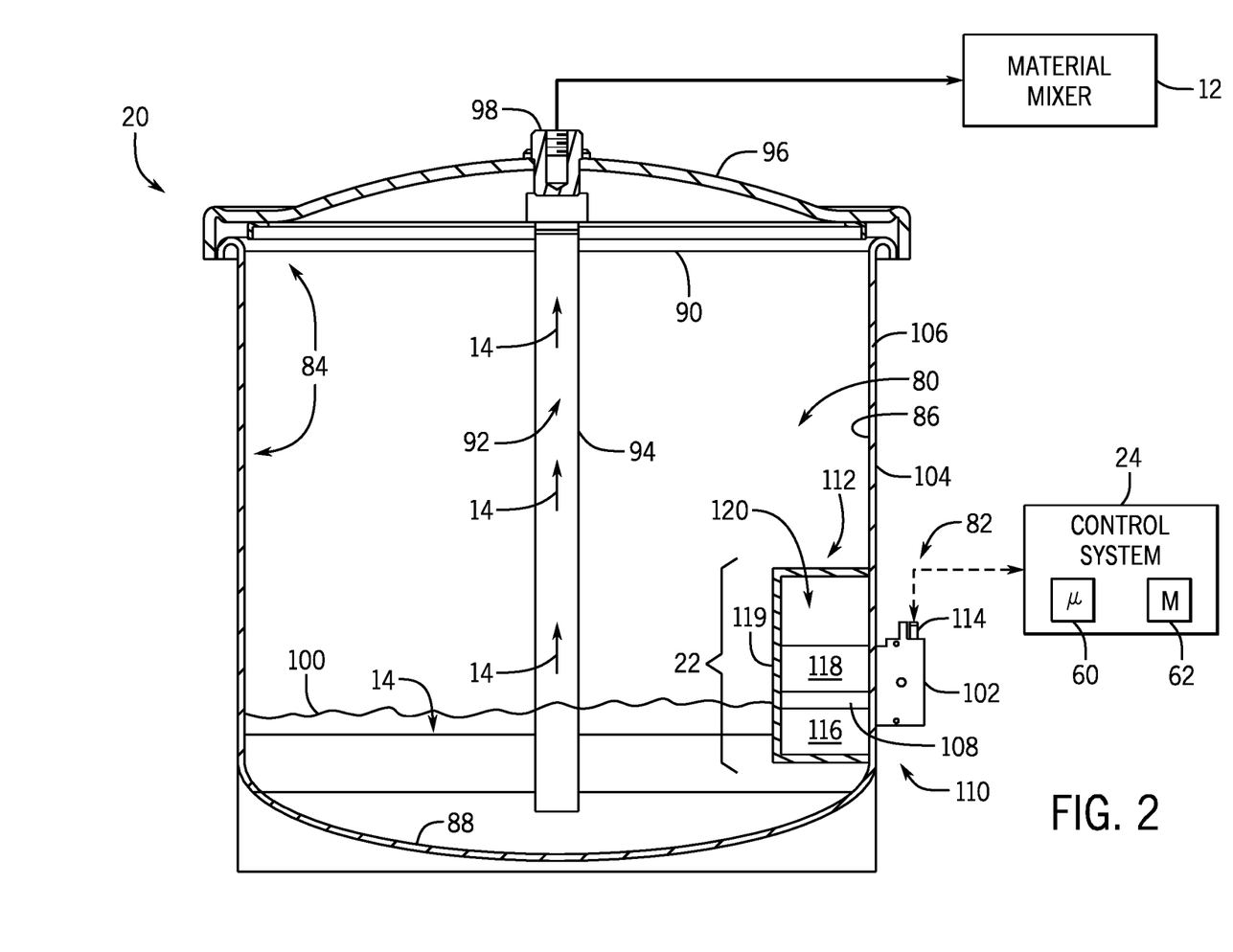
FIG. 2 is a perspective view of an embodiment of a material sensor system disposed within a material tank of FIG. 1.

FIG. 2 is a block diagram of an embodiment of the material sensor system 22 within the system 10. Specifically, in the illustrated embodiment, the material sensor system 22 is disposed within the material tank 20, and may be configured to detect an interruption in the flow of the material 14 from the pressure tank 22 to the material mixer 12. For example, the material sensor system 22 may be disposed within an inner cavity 80 of the material tank 20 to detect an interruption of the flow of the material 14 from the material tank 20 to the material mixer 12. In certain situations, for example, flow of the material 14 may be interrupted when the material tank 20 is an empty container and/or is a tank of the material 14 (e.g., paint, water, ink, varnish, catalyst, resin, stain, solvent, acids, etc.) that needs to be refilled and/or replaced. As a further example, the flow of the material 14 may be interrupted in "out-of-material" conditions, such as when the tank 20 is empty, almost empty, or when a supply of the material 14 within the material tank 20 needs to be replaced and/or refilled. Accordingly, the material sensor system 22 may be configured to determine one or more operating conditions of the material tank 20, and may provide one or more control signals 82 associated with the operating conditions (e.g., the flow of the material 14 within the pressure tank 20) to the control system 24, as further described in detail below.

In certain embodiments, the material sensor system 22 may be disposed within the inner cavity 80 of the material tank 20 and communicatively coupled to the control system 24. For example, the material sensor system 22 may be attached to an inner surface 84 of the inner cavity 80, such as adjacent to a sidewall 86 of the inner cavity 80. In certain embodiments, the material sensor system 22 may be attached to a bottom surface 88 or a top surface 90 of the inner cavity 80. Indeed, the material sensor system 22 may be attached anywhere along a flow path 92, which may be a path that the material 14 flows along from the material tank 20 to the material mixer 12. In certain embodiments, the material 14 may flow through a fluid tube 94 disposed within the inner cavity 80, through a lid 96 of the material tank 20, and to the material mixer 12. For example, the material 14 may exit the material tank 20 through the material outlet 98 of the material tank 20.

In the illustrated embodiment, the flow of the material 14 along the flow path 92 may be interrupted when the level 100 of the material 14 within the material tank 20 is low. For example, in certain situations, material level 98 disposed within the inner cavity 80 (e.g., paint, water, ink, varnish, catalyst, resin, solvent, etc.) may be low because the material tank 20 may need to be refilled and/or replaced. As a further example, a material leak along the flow path 92 (e.g., a leak through one or more conduits or supply hoses and/or a leak within the material tank 20 and/or between the material tank 20 and the material mixer 12) may interrupt the flow of the material to the material mixer 12. In these and other situations, the material sensor system 22 may be configured to detect an interruption of the flow of the material. Furthermore, as described above with respect to FIG. 1, the control system 24 may be configured to automatically shut off the material tank 20 upon detecting an out-of-material condition.

For example, in certain embodiments, the material sensor system 22 includes a switch 102 coupled an outer surface 104 of the material tank 20. The switch 102 may me communicatively coupled to other components of the material sensor system 22 through a wall 106 of the material tank 20. For example, the material sensor system 22 may include various components (e.g., a magnet 108, a float system 110 with one or more floats, a float guide 112, etc.) disposed along an inner surface 86 of the inner cavity 80, and features of these components may be coupled to the switch 102 disposed on the outer surface 104 through the wall 106. In various embodiments, the switch 102 may be a pneumatic switch, an electrical switch, a magnetic switch, a mechanical switch, or a combination thereof. In the illustrated embodiment, the switch 102 may include a signal outlet 114 to provide the one or more control signals 82 to the control system 24 when an out-of-material condition is detected. For example, in situations where the supply of the material 14 is low (e.g., the level 100 of the material 14 is low) and there is an interruption in the flow of the material 14 along the flow path 92 to the material mixer 12, the material sensor system 22 may be configured to send the one or more control signals 82 to the control system 24. As noted above, the control system 24 may shut off or suspend an operation of the material mixer 12 upon receiving the control signals 82. In certain situations, the control system 24 may be configured to adjust a blending of the materials 14 within the material mixer 12 based on the feedback from the material sensor system 22.

In certain embodiments, the material sensor system 22 may include the float system 110 having one or more floats and the magnet 108. In the illustrated embodiment, the magnet 108 is disposed between a first float 116 and a second float 118. Further, as noted above, the material sensor system 22 may include the switch 102 that is coupled to the float system 110 through the wall 106. The switch 102 may be a pneumatic switch configured to provide the one or more control signals 82 to the control system 24 when an out-of-material condition is detected, such as when the level 100 of the material 14 within the inner cavity 80 falls below a threshold level. In particular, the pneumatic switch may be activated by the position of the magnet 108 within the float guide 112 of the material sensor system 22, as further described in detail below.

In certain embodiments, the float system 110 may include a float guide 112 that may include a float wall 119 that is configured to surround a float cavity 120. In certain embodiments, the one or more floats (e.g., first float 116 or the second float 118) of the float system 110 may move laterally up and down within the float cavity 120 based on the level 100 of the material 14 within the inner cavity 80. Specifically, each float of the float system 110 may be a hollow chamber filled with air, or any other type of material that facilitates floating within the float cavity 120. In certain embodiments, the one or more floats may include one or more thin walls formed out of a stainless steel material. In other embodiments, any type of light material that enables the floats to float within the float cavity 120 may be utilized. Further, any type of material that is also chemically resistant to the material 14 may be utilized. In certain embodiments, each float of the float system 110 may surround the magnet 108. In the illustrated embodiment, a single magnet 108 is disposed between two floats 116, 118. However, it should be noted that any number of magnets 108 (e.g., 2, 3, 4, 5, 6, or more) may be disposed within the float system 110. Furthermore, any number of floats (e.g., 1, 3, 4, 5, 6, 7, 8, 9, or 10) may be utilized to surround the magnet 108 within the float system 110. In particular, the magnet 108 may be surrounded and sealed by the floats and may be contained entirely within the float system 110.

In certain embodiments, the float system 110 may be designed to have a specific gravity (e.g., low gravity) that enables the float system 110 to float within one or more different types of liquids and sink within one or more different types of gases. For example, the float system 110 may float within the material 14 (e.g., paint, ink, varnish, water, catalyst, resin, acids, stains, solvent, etc.) and may sink within air. Accordingly, when the inner chamber 80 is filled with the material 14, the float system 110 (including the magnet 108) rises and floats to the top of the float chamber 120. In certain embodiments, the magnet 108 and/or the float system 110 may be a donut-shaped device that floats (e.g., rises and falls) within the float chamber 120. In this manner, when the inner cavity 80 is filled with the material 14, the magnet 108 of the float system 110 may be positioned away from the switch 102 (e.g., pneumatic switch). Likewise, when a quantity of the material 14 within the inner cavity 80 is low (e.g., at the level 100), the magnet 108 of the float system 110 may be positioned to trigger the switch 102. In other words, when the amount of material 14 within the inner cavity 80 is low, the magnet 108 of the float system 110 may be configured to trigger the switch 102, thereby sending control signals 82 to the control system 24.

In particular, when the magnet 108 is within close proximity to the switch 102, the magnetic field generated by the magnet 108 may trigger and open the switch 102. For example, when the magnet 108 is within a particular distance of the switch 102, the magnet 108 may be configured to generate a magnetic field that engages and/or opens the switch 102. As noted above, when the switch 102 is engaged or opened, the switch 102 may be configured to provide the control signals 82 to the control system 24. Accordingly, an out-of-material condition may cause the magnet 108 of the float system 110 to generate a magnetic field that is detected by the switch 102, and the switch 102 may be configured to send one or more control signals 82 to the control system 24 based on the out-of-material condition. Furthermore, the control system 24 may shut off an operation or a blending within the material mixer 12 upon receiving the control signals 82. In this manner, the switch 102 may be activated by the position of the magnet 108 within the float cavity 120 of the material sensor system 22, and the position of the magnet 108 may be dependent on the flow of the material 14 along the flow path 92 (e.g., continuous, interrupted, etc.).

Figure 3:
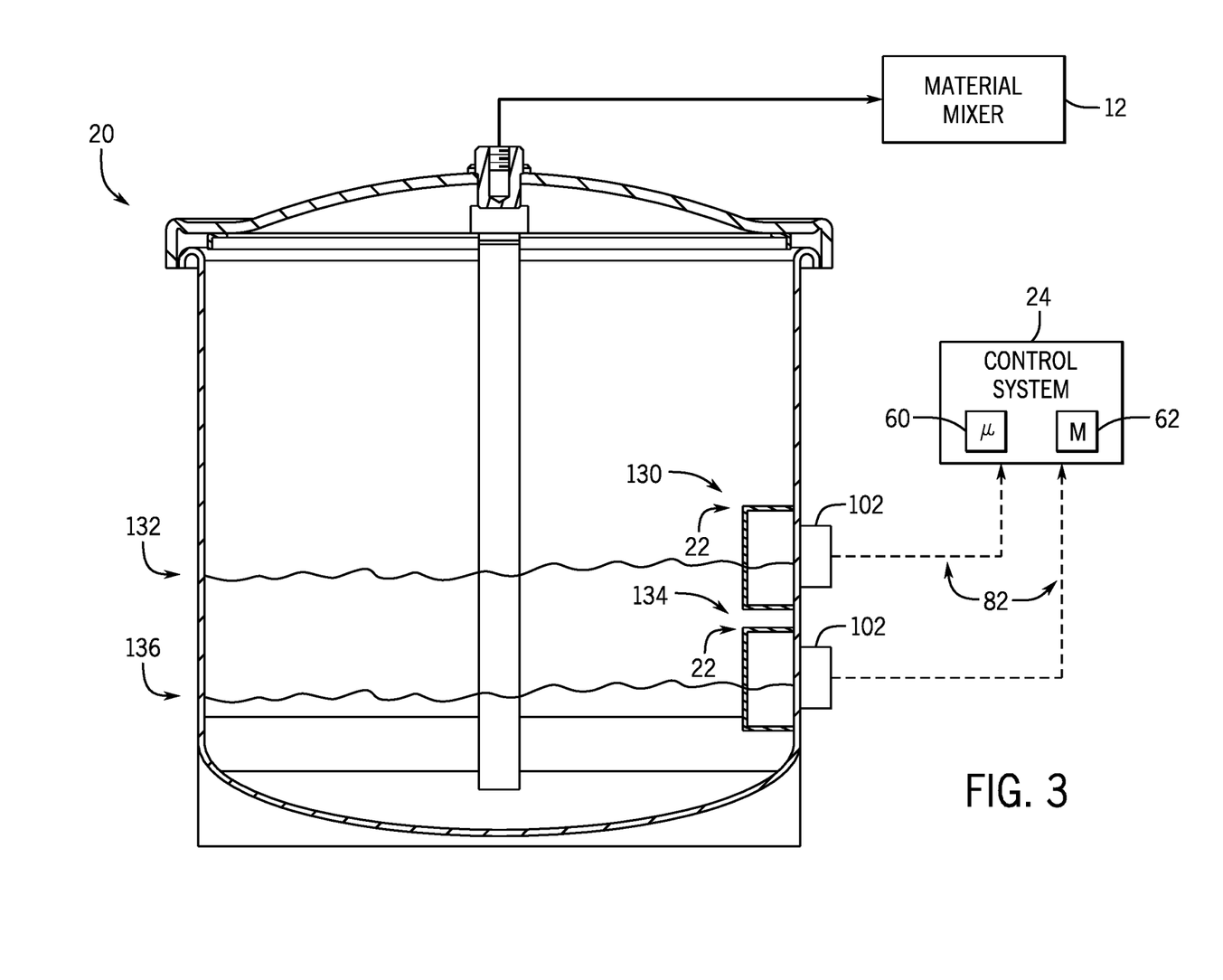
FIG. 3 is a perspective view of an embodiment of one or more material sensor systems disposed within a material tank of FIG. 1, where the one or more material sensor systems provide one or more different control signals.

FIG. 3 is a schematic block diagram 130 of an embodiment of the material tank 20 of FIG. 1. In particular, in the illustrated embodiment, the material tank 20 includes one or more material sensor systems 22 each communicatively coupled to the control system 24. In certain embodiments, each material sensor system 22 may be configured to provide an indication of the level of the material 14 within the inner cavity 80 to the control system 24. For example, in certain embodiments, a first material sensor system 130 may be configured to provide control signals 82 to the control system 24 when the level of the material 14 within the material tank 20 falls below a first threshold 132. Likewise, the second material sensor system 134 may be configured to provide control signals 82 to the control system 24 when the level of the material 14 within the material tank 20 falls below a second threshold 134. In this manner, the control system 24 may determine different levels (or quantities) of the material 14 within the inner cavity 80 of the material tank 20, thereby allowing the control system 24 to regulate the operation of the material mixer 12 based the amount of the material 14 available. For example, in certain situations, the control system 24 may be configured to regulate the blending of the materials 14 based on the quantity of the materials 14 available. Further, in certain situations, the control system 24 may be configured to adjust the ratio of the composition of the mixed material 16 based on the quantity of the materials 14 available. Further still, in certain situations, the control system 24 may provide an alert or warning to the operator based on the level of the material 14 within the inner cavity 80. Specifically, in certain situations, the control system 24 may indicate when the material tank 20 needs to be replaced and/or refilled based on feedback from the first material sensor system 130. Further, the control system 24 may shut-off the operation of the material mixer 12 and/or adjust the blending of the first and second materials 52, 56 based on the feedback from the second material sensor system 132.

In certain embodiments, the system 10 may include a plurality of material tanks 20, each including a different material 14 and/or a different composition of the same material 14. In particular, each of the plurality of material tanks 20 may route the different material 14 and/or the different composition of the same material 14 to the material mixer 12. In certain embodiments, one or more of the material tanks 20 may encounter an out-of-material condition, which may result in the paint mixer 12 blending an inaccurate composition of the mixed material 16. Indeed, it may be beneficial to utilize one or more material sensor systems 22 with each of the one or more material tanks 20 to continuously monitor the material levels of each material tank 20. Further, as noted above, the control system 24 may be configured to turn off the material flow from a particular component of the system 10 (e.g., a single material tank 20), the paint mixer 12, and/or the system 10 as a whole based on feedback from one or more of the material sensor systems 22 disposed within the material tank 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A material supply system, comprising:
a material sensor system coupled to a material tank configured to receive a material and output a flow of the material toward a spray component via pressurization within the material tank, wherein the material sensor system comprises:
a float system coupled to an inner surface of a wall of the material tank, wherein the float system comprises a float configured to float within a float cavity; and
a switch coupled to an outer surface of the wall of the material tank, wherein the switch is communicatively coupled to the float system through the wall of the material tank, and the wall of the material tank extends continuously between the float system and the switch to isolate the switch from an interior of the material tank;
a material mixer configured to receive the flow of the material from the material tank; and
a control system communicatively coupled to the material sensor system and to the material mixer, wherein the control system is configured to receive one or more signals from the material sensor system, and wherein the control system is configured to regulate operation of the material mixer based on the one or more signals.

2. The material supply system of claim 1, wherein the switch is a pneumatic switch.

3. The material supply system of claim 1, wherein the switch is configured to send the one or more signals to the control system when a quantity of the material within the material tank falls below a threshold level.

4. The material supply system of claim 1, wherein the material to a material mixer is fluidly coupled between the material tank and the spray component.

5. The material supply system of claim 1, wherein the material comprises paint, ink, water, resin, varnish, catalyst, one or more stains, one or more acids, solvent, or a combination thereof, wherein the material tank is configured to output the flow of the material to the material mixer, wherein the material mixer is fluidly coupled between the material tank and the spray component.

6. The material supply system of claim 1, wherein the float is a first float, wherein the float system comprises a second float, wherein a magnet is disposed between the first float and the second float to structurally separate the first float from the second float, and wherein the switch is configured to send the one or more signals when the magnet engages the switch.

7. The material supply system of claim 1, wherein the float system comprises a magnet disposed within an interior of the float.

8. The material supply system of claim 7, wherein the switch is configured to send the one or more signals to the control system when the magnet engages the switch.

9. The material supply system of claim 1, wherein the material sensor system is a first material sensor system, and the material supply system comprises a second material sensor system coupled to the material tank.

10. The material supply system of claim 9, wherein the first and second material sensor systems are configured to send control signals to the control system corresponding to a quantity of the material within the material tank.

11. A material supply system, comprising:
a material tank configured to receive a material and output a flow of the material toward a spray component via pressurization within the material tank;
a material sensor system coupled to the material tank, wherein the material sensor system comprises:
a float system coupled to an inner surface of a wall of the material tank, wherein the float system comprises a float configured to float within a float cavity; and
a switch coupled to an outer surface of the wall of the material tank, wherein the switch is communicatively coupled to the float system through the wall of the material tank, wherein the wall of the material tank extends continuously between the float system and the switch to structurally separate the float system and the switch from one another, wherein the switch is configured to output one or more signals comprising information associated with the flow of the material;
a material mixer configured to receive the flow of the material from the material tank; and
a control system communicatively coupled to the material sensor system and to the material mixer, wherein the control system is configured to receive the one or more signals from the switch, wherein the control system is configured to determine a quantity of the material within the material tank based on the one or more signals and to adjust operation of the material mixer based on the quantity of the material within the material tank.

12. The material supply system of claim 11, wherein the control system is configured to operate the material mixer to adjust blending of the material within the material mixer based on the quantity of the material within the material tank.

13. The material supply system of claim 11, wherein the material mixer is configured to receive an additional flow of an additional material from an additional material tank, and the control system is configured to operate the material mixer to adjust blending of the material and the additional material within the material mixer based on the quantity of the material within the material tank.

14. The material supply system of claim 11, wherein the control system is configured to terminate the flow of the material from the material tank to the material mixer based on the one or more signals.

15. The material supply system of claim 11, wherein the switch is configured to send the one or more signals when the quantity of the material within the material tank falls below a threshold level.

16. The material supply system of claim 11, wherein the float is a first float, wherein the float system comprises a second float, wherein a magnet is disposed between the first float and the second float to structurally separate the first float from the second float, and wherein the switch is configured to send the one or more signals when the magnet engages the switch.

17. The material supply system of claim 11, wherein the float is one of a plurality of floats of the float system, wherein the float system comprises a magnet, and wherein the magnet is surrounded and sealed by the plurality of floats.

18. A material supply system, comprising:
one or more material tanks, wherein each material tank is configured to receive a material and output a flow of the material toward a spray component via pressurization within the one or more material tanks, wherein each material tank comprises at least one material sensor system, and wherein each material sensor system comprises:
a float system coupled to an inner surface of a wall of a corresponding material tank of the one or more material tanks, wherein the float system comprises a float configured to float within a float cavity of the corresponding material tank; and
a switch coupled to an outer surface of the wall of the corresponding material tank, wherein the switch is communicatively coupled to the float system through the wall of the corresponding material tank, the wall of the corresponding material tank extends continuously between the float system and the switch to isolate the switch from an interior of the corresponding material tank, and wherein the switch is configured to output one or more signals comprising information associated with the material in the corresponding material tank;
a material mixer configured to receive the flow of the material from each material tank and mix the flow of the material from each material tank to produce a mixed material; and
a control system communicatively coupled to each material sensor system and to the material mixer, wherein the control system is configured to receive the one or more signals from a corresponding switch of each material sensor system and to adjust blending of the material from each material tank within the material mixer based on the one or more signals.

19. The material supply system of claim 18, wherein the control system is configured to determine a quantity of the material within each material tank based on the one or more signals received from the corresponding switch of each material sensor system and adjust a ratio of a composition of the mixed material based on the quantity of the material within each material tank.

20. The material supply system of claim 18, wherein the control system is configured to terminate the flow of the material from a particular material tank to the material mixer based on the one or more signals received from the corresponding switch of the particular material tank.

* * * * *